UNITED STATES PATENT OFFICE.

OSCAR BIRGER CARLSON, OF AVESTA, SWEDEN, ASSIGNOR TO AKTIEBOLAGET CARLIT, OF STOCKHOLM, SWEDEN, A CORPORATION OF SWEDEN.

METHOD OF MANUFACTURING AMMONIUM PERCHLORATES.

1,338,357. Specification of Letters Patent. Patented Apr. 27, 1920.

No Drawing. Application filed September 25, 1917. Serial No. 193,091.

*To all whom it may concern:*

Be it known that I, OSCAR BIRGER CARLSON, a subject of the King of Sweden, and resident of Månsbo, Avesta, in the Kingdom of Sweden, have invented certain new and useful Improvements in Methods of Manufacturing Ammonium Perchlorates, of which the following is a specification.

This invention relates to a method of manufacturing ammonium perchlorate with the object in view of producing explosives, by the method in which sodium perchlorate is decomposed by ammonium sulfate.

If one tries to separate ammonium perchlorate by means of crystallization from the solution obtained by adding ammonium sulfate to sodium perchlorate after the said solution has been sufficiently concentrated in any desired manner, ammonium perchlorate will precipitate on cooling the said solution, but at a certain point the by-product, sodium sulfate, will also crystallize, containing 10 molecules of water of crystallization. On account of this a fresh quantity of ammonium perchlorate inclosed within the sodium sulfate will also be deposited. It is very difficult and expensive to separate ammonium perchlorate from the by-product in this way. This fact which is based upon the known condition of crystallization of sodium sulfate, is evidently the reason why ammonium sulfate has not hitherto come into use in producing ammonium perchlorate. Further investigations have proved, that the greater part of the ammonium perchlorate has, contrary to expectation, crystallized before the crystallization of the sodium sulfate takes place, and moreover that in the presence of ammonium perchlorate this crystallization begins, on account of phenomena of supersaturation, at about 26° cent. instead of at 33° cent. Thus, there is nothing to prevent the use of ammonium sulfate for the conversion, provided that the mother liquor is separated from the deposited ammonium perchlorate at a temperature somewhat above 26° centigrade. In order to get out the ammonium perchlorate, which is still in the mother liquor, the latter is concentrated by boiling, whereby waterfree sodium sulfate deposits while the liquor is hot and is separated before the same has become cold. In this manner a solution containing ammonium perchlorate practically free from sodium sulfate is obtained, and so on. The ammonium perchlorate obtained in this way contains but a small quantity of sodium sulfate, as the solubility of the waterfree sodium sulfate increases when temperature decreases. In the above manner the ammonium perchlorate can be quantitatively separated at the same time as the sodium sulfate is obtained free from water and ammonia. If one should not wish to use evaporation, the mother liquors may be employed to dissolve fresh quantities of sodium perchlorate and ammonium sulfate. In these operations waterfree sodium sulfate also deposits from the solutions and is then removed.

It has been found that, on account of the conditions of solubility, it is possible to proceed in two ways in practically making the conversion. According to the first way hot solutions of ammonium sulfate and sodium perchlorate are mixed together; one of these solutions may also be replaced by the corresponding salt in solid state, whereupon the ammonium perchlorate deposits, when the solution is cooled. According to the second way cold solutions are used; one of these may also be replaced by solid salt. If a solid salt is used the temperature will rise from 35°–40° because heat is developed by the reaction. The greater part of the sodium sulfate deposits during the mixing operation. The temperature is then allowed to fall to about +26°, and ammonium perchlorate precipitates and is separated from the mother liquor, before the sodium sulfate with 10 molecules of water of crystallization begins to crystallize.

However, one will encounter unexpected difficulties in carrying out the method described, especially during the boiling of the mother-liquor. Ammonium perchlorate is not stable at boiling temperatures but yields some ammonia while the perchloric acid liberated attacks the walls of the boiling utensils strongly if they are composed of metal. Almost all metals, besides, form perchlorates easily, which contaminate the solution and may be removed only with difficulty. A rapid wear of the apparatus and an impure product will be the result. However, a fact which practically is much more important consists in the difficulties encountered in heating the solution to the boiling temperature owing to the decreased solubility of sodium sulfate at the higher temperatures. As is known the solubility of the salt decreases as the temperature increases. In an evaporating apparatus the liquid is chiefly heated at the surface adjacent the source of heat. At that very place the solubility of the sodium sulfate will thus be a minimum and because of this it will deposit in an anhydrous state as a hard coat on the surface of the heating body. As this anhydrous salt forms a very bad conductor of heat the heat transmission will decrease quite materially. The phenomena will appear in a higher degree with solutions of sodium sulfate containing ammonium perchlorate. If because of this one tries to evaporate, for instance in an open vessel, the solution of sodium sulfate and ammonium perchlorate by means of a steam tube, boiling, which is at the start very brisk will decrease so that after some time, only a slow evaporation will take place. This is a considerable source of trouble in manufacturing on a large scale which increases the consumption of fuel and involves the use of an expensive and bulky apparatus.

The present invention relates to a process for avoiding said troubles. If the properties of the solution of sodium sulfate and ammonium perchlorate obtained in the manufacturing of ammonium perchlorate are more particularly examined it will be found that at temperatures below 100° C. the conditions of solubility turn out more favorably. A materially less quantity of sodium sulfate will precipitate for instance at 80° C. than at 110° C. Besides the salt precipitates at temperatures below 100° C. as a granular crystalline mass which is easily loosened and falls away from the heating surfaces especially if the liquid is at the same time kept in motion. At 110° C., on the contrary, a hard smooth coat is formed on the heating surfaces as mentioned.

Besides at temperatures below 100° C. the perchlorate will practically not decompose, on account of which a loss of salt, wear of apparatus and an impure product are avoided. In order to avoid the difficulties mentioned above which make a regular working impossible the evaporation is according to the present invention, carried out at temperatures below 100° C. and for the carrying out of the process apparatus working with vacuum are used, but there may of course also other processes be devised. In this case, surprisingly, evaporation apparatus, for instance of iron can be used while at rather high temperatures not even lead can be used for a great length of time. In practice it is preferable to start the evaporation at a temperature of liquid of about for instance 60° C. and as the concentration in ammonium perchlorate increases to raise the temperature so that the separation of the ammonium perchlorate solution from the deposited sodium sulfate can be made for instance at about 80°–85° C., whereby a maximum amount of sodium sulfate in an anhydrous state may be removed in one operation and that at the same time a solution as concentrated as possible of ammonium perchlorate may be obtained. The strong circulation of liquid occurring during the vacuum evaporating also contributes to avoiding incrustations. If one works according to the invention now described, the whole evaporating process will run smoothly and without any difficulty.

Having now described my invention, what I claim as new and desire to secure by Letters Patent is:

Method of manufacturing ammonium perchlorate which consists in mixing solutions of ammonium sulfate and sodium perchlorate, cooling the resulting solution to precipitate ammonium perchlorate at a temperature not materially above 26° C., removing the precipitated perchlorate, and evaporating the mother liquor at a temperature between 45° and 100° C., whereby anhydrous sodium sulfate is precipitated and a solution concentrated with respect to ammonium perchlorate is obtained.

In witness whereof, I have hereunto signed my name.

OSCAR BIRGER CARLSON.